Dec. 23, 1941.  H. W. PLEISTER  2,267,420
BOLT ANCHOR
Filed July 10, 1941  3 Sheets-Sheet 1

Henry W. Pleister INVENTOR
BY Alan W. Johnson ATTORNEY

Dec. 23, 1941.  H. W. PLEISTER  2,267,420
BOLT ANCHOR
Filed July 10, 1941  3 Sheets-Sheet 2
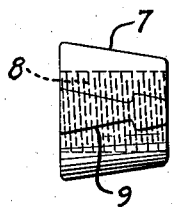
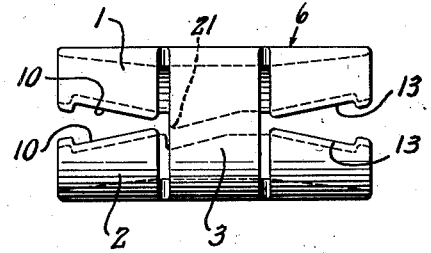
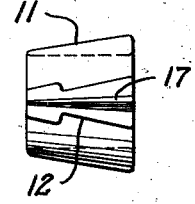
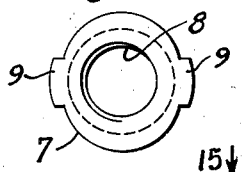
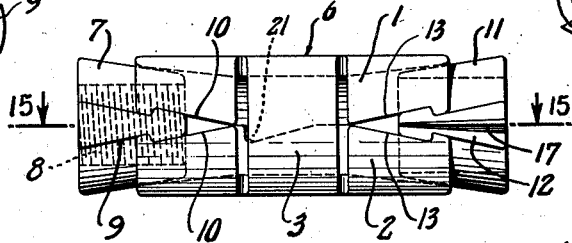
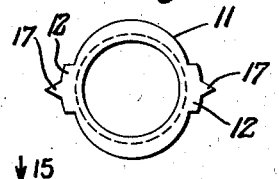
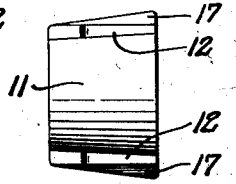
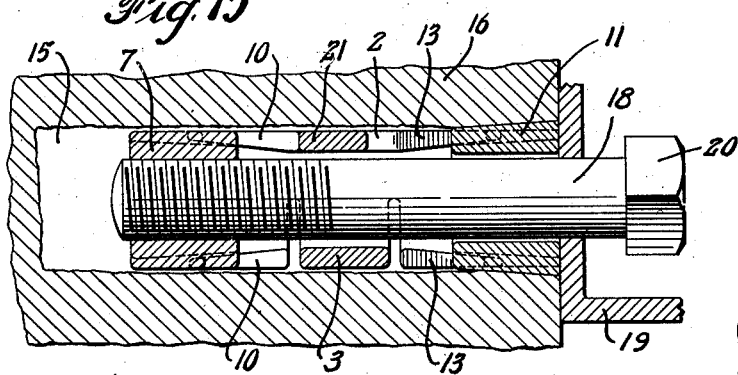
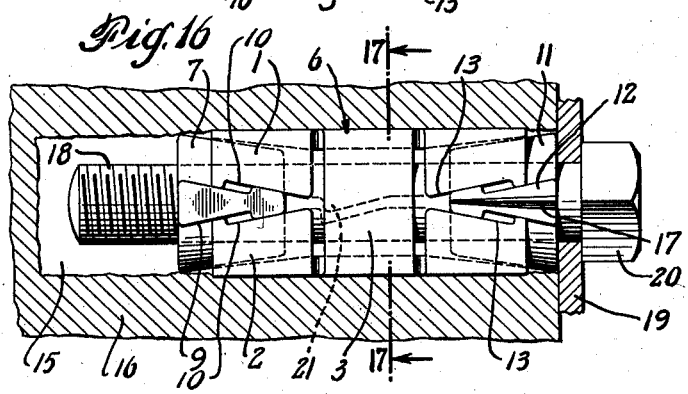
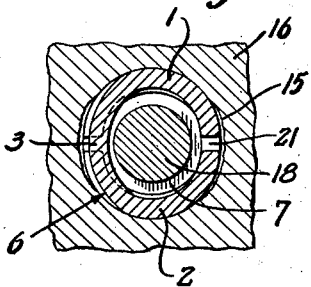
INVENTOR
Henry W. Pleister
BY
...
ATTORNEY Dec. 23, 1941.  H. W. PLEISTER  2,267,420
BOLT ANCHOR
Filed July 10, 1941   3 Sheets-Sheet 3

Harry W Pleister INVENTOR
BY
ATTORNEY

Patented Dec. 23, 1941

2,267,420

UNITED STATES PATENT OFFICE 2,267,420

BOLT ANCHOR

Henry W. Pleister, Westfield, N. J., assignor to Diamond Expansion Bolt Company, Inc., Garwood, N. J., a corporation of New Jersey Application July 10, 1941, Serial No. 401,777

15 Claims. (Cl. 85—2.8)

My invention relates to bolt anchors and also to the method of their manufacture. This particular application covers my improved bolt anchor as an article of manufacture. A companion application, which in effect, is a divisional application, covering the Method of manufacturing bolt anchors, was filed July 11, 1941, Serial No. 401,971.

More particularly my invention is an improvement on the invention covered by my U. S. Patent 1,549,327, granted August 11, 1925.

The improvements over this former patent will more fully appear in the specification and claims of this application.

My present invention further relates to certain combinations, details of construction, and articles of manufacture, which will be more fully hereinafter described and pointed out in the claims.

I have shown two embodiments of my invention, by way of example, in the drawings, in which—

Fig. 8 is a plan view of the integral shield bent sufficiently to receive the conical non-circular threaded nut and the non-circular unthreaded conical sleeve;

Fig. 9 is a plan view of the non-circular screw-threaded cone nut about to be assembled in the shield, Fig. 8;

Fig. 11 is a plan view of the non-circular unthreaded cone sleeve about to be assembled in the shield, Fig. 8;

Fig. 10 is an end elevation of the non-circular screw-threaded cone nut, Fig. 9;

Fig. 12 is an end elevation of the non-circular unthreaded cone sleeve;

Fig. 13 is a side elevation of the unthreaded cone sleeve;

Fig. 14 is a plan view of the complete integral shield with its cooperating conical screw-threaded nut, Fig. 9, and its conical unthreaded sleeve, Fig. 11, locked in position by further bending the two sections 1 and 2 towards each other;

Fig. 15 is a vertical section through a wall, or other support, illustrating my bolt anchor about to be expanded by a machine bolt to support the work on the wall;

Fig. 16 is a horizontal section showing my bolt anchor expanded;

Fig. 17 is a cross-section on lines 17—17 of Fig. 16, looking in the direction of the arrows;

Fig. 18 is a side elevation of the casting after being bent in any suitable manner to bring the two integral shield sections opposite each other;

Fig. 19 is a vertical section through a wall or other support, showing my single expansion machine bolt anchor about to be expanded by a machine bolt;

Fig. 20 is a vertical section, similar to Fig. 19, showing the position of the parts at maximum expansion, and the integral web or neck acting as a stop for the expanding lug on the screw-threaded nut.

Figure 1:
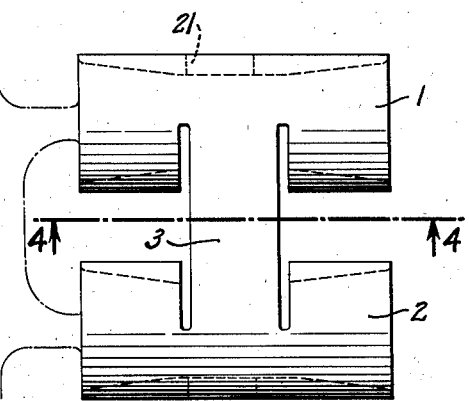
Fig. 1 is a plan view of the casting from which I preferably form the shield for my bolt anchor. The dotted lines indicate the gate for the mold.

Prior to my present invention, and in my prior patent previously referred to, the shield sections are held together by two spring rings for handling, shipping, and insertion within a hole usually drilled in masonry, stone, concrete, brick, or similar material.

In double expansion machine bolt anchors these spring rings allow the shield to expand too easily; so easily in fact that if the bolt anchor is inserted in the wall and the threaded nut, or the forward end of the shield should contact with the sides of a misdrilled hole, the shield will begin to expand automatically, while in the process of insertion. This makes it impossible to insert the bolt anchor all the way in the hole. The bolt anchor must then be taken out and worked in some other way. This may be done by drilling a hole a little larger, or by turning a machine bolt into the nut and driving the bolt anchor further into the hole by tapping the head of the bolt with a hammer. Often this cannot be successfully done, leading to the loss of time and increasing the expense of installation.

It is quite desirable that the shield sections should expand very easily before they make frictional contact with the inner surface of the hole. The reason for this is, that if they do not expand easily, the friction of the thread on the machine bolt, cooperating with the thread on the nut, will cause the shield sections to rotate in the hole and no expansion will occur.

This free expansion, however, has its serious drawbacks. If on inserting the expanding shield sections in the hole in the wall, the hole should be slightly tight or its surfaces rough, parts of the bolt anchor, particularly the inner nut, will be impeded in the act of insertion and the shield sections will be expanded before the head of the bolt anchor is fully inserted in the hole. When this occurs no amount of hammering will improve the situation, because the more hammering that was done on the collar or outer end of the bolt anchor, greater would be the expansion of the shield sections inside the hole. They would lock or bind so as to make it impossible for the bolt anchor to be fully seated in the hole.

In order to overcome this objection, I have provided a rigid connection between the two shield sections to lessen the number of parts to be manufactured and assembled, to increase the rigidity of the bolt anchor for transportation and handling, and yet not to such a degree that the bolt anchor cannot be readily expanded in the hole when expansion is desired. This rigid connection between the two parts of the shield sections also prevents accidental separation of the separate parts of the bolt anchor, and cheapens the cost of manufacture.

It is true, that any projection on the shield sections, or on the nut, would prevent the rotation of the bolt anchor in the hole, but, at the same time, such a projection would cause the shield sections to bind when inserting them in the hole, leading to premature expansion and preventing the bolt anchor from being completely inserted in the hole.

To overcome the objections previously referred to, I preferably connect the shield sections by a comparatively rigid and short integral web or neck located preferably midway between their ends, to insure a balanced parallel expansion of the bolt anchor. The web or neck should not be of such length as to cause all the expansion to occur on the free sides of the shield sections, as this would give an unbalanced expansion at one side of the shield, and one which might separate the free sides of the shield sections to a degree where the stop on the nut, to be hereinafter described, would escape contact with its cooperating stop on the shield section.

The first step in my invention is to form a casting of any suitable metal, such as malleable iron, or any other suitable material, in which the two shield sections 1 and 2 and the integral connecting web or neck 3 are cast at the same time, the web or neck 3 being cast in a straight line, with the two shield sections cast horizontally, so that both shield sections 1 and 2 and the integral web or neck 3 may be drawn from the sand in the flask without the use of cores.

Figure 3:
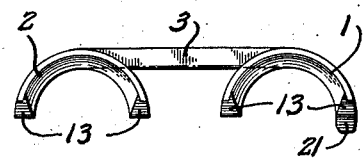
Fig. 3 is a perspective view of the casting from which the bolt anchor shield is preferably made.
Figure 2:
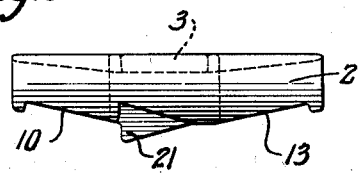
Fig. 2 is a rear elevation of one of the integral shield sections which is provided with a stop to cooperate with one of the stops carried by the screw threaded conical nut, to prevent further relative movement between the shield and nut. The other stop on the nut cooperates with the integral web or neck which also acts as a stop.
Figure 4:
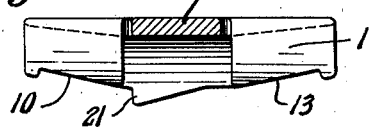
Fig. 4 is a cross-section on line 4—4 of Fig. 1 looking in the direction of arrows.
Figure 5:
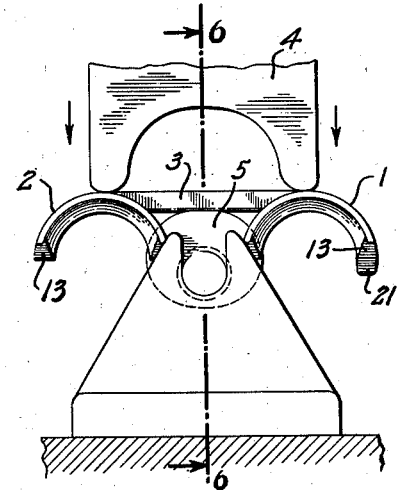
Fig. 5 is a side elevation of one form of press for shaping the casting, which is shown mounted on the round anvil of the press, about to be shaped.
Figure 6:
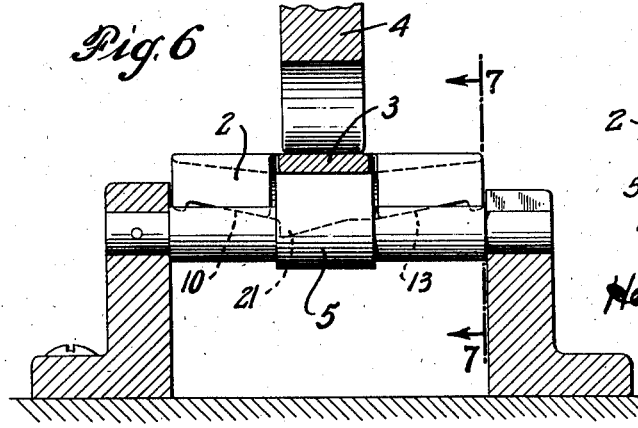
Fig. 6 is a transverse section on line 6—6 of Fig. 5 looking in the direction of the arrows.
Figure 7:
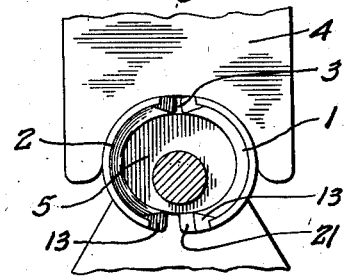
Fig. 7 is a sectional view on line 7—7 of Fig. 6 looking in the direction of the arrows, showing the two integral sections of the shield bent towards each other, ready to receive the cooperating non-circular threaded cone nut and the non-circular unthreaded cone sleeve.

The casting, Fig. 3, is then bent in any suitable manner as by a press. A simple form of press which may be used is one having a hammer 4, and a curved anvil 5, Fig. 5. The casting is located in the press with the integral web or neck 3 resting upon the curved anvil 5. By applying pressure to the hammer in the direction of the arrows, Fig. 5, the two sections 1 and 2 of the bolt anchor shield 6 are bent towards each other, the integral web or neck 3 being bent into a semicircle, Figs. 7, 8 and 14, by the press, so that it will conform to the uniform diameter of the shield 6.

This first bending or forming of the casting is preliminary to permit the shield 6 to receive and hold the expanding members, which are the screw-threaded conical nut 7, provided with the internal screw-threads 8, and the two inclined or wedged lugs 9—9, which are mounted between the meeting edges 10—10 of the shield sections 1 and 2; and also to receive the other expanding member, the unthreaded conical sleeve 11 with its inclined or wedged lugs 12—12, which are mounted between the meeting edges 13—13 of the two shield sections 1 and 2.

After the threaded cone nut 7 and the unthreaded cone sleeve 11 are located in their proper positions, the integral shield sections 1 and 2 are subjected to further pressure, Fig. 14, to lock the cone nut 7 and cone sleeve 11 in the shield sections, thereby forming the complete double expansion machine bolt anchor.

The integral web or neck 3 is sufficiently rigid to firmly hold the conical nut 7 and conical sleeve 11 to the shield sections and prevent accidental disengagement in handling and transportation, and also prevent accidental or premature expansion of the shield sections 1 and 2 when inserted in a hole 15 in a wall or other support 16, Fig. 15.

This integral web or neck 3 also avoids the use of two springs to hold the sections together and the necessity of casting grooves for the springs. It is, however, sufficiently flexible to bend slightly when the expansion is created, and to permit the shield sections to be forced apart uniformly so that the dividing space between each will be approximately the same on the right and left side of the complete shield 6.

Both the conical nut 7 and the conical sleeve 11 are non-circular in cross sections, being preferably elliptical in cross section, Figs. 10, 12 and 17.

On the expanding lugs 12—12, on the unthreaded sleeve 11, I preferably cast inclined thin integral ribs 17—17, one on each lug 12. These ribs 17—17 being placed on the top of the lugs 12—12 will permit their free passage between the meeting surfaces 13—13 of the shield sections 1 and 2.

The ribs 17—17 are preferably used to overcome, by engaging with the surface of the hole, the drag or friction of the screw-threads on the machine bolt 18 which, if sufficient, would cause the bolt anchor to rotate in the hole 15 without being expanded.

If necessary to seat the bolt anchor within the hole, the sleeve 11 may be given one or more blows by a hammer, the ribs 17—17 being sufficiently thin to collapse before the sleeve 11 would be distorted or the bolt anchor expanded. Obviously, should one or more of these ribs 17—17 be placed on the screw-threaded nut 7, or on either one of the shield sections 1 and 2, or the integral neck or web 3, they would cause a premature expansion of the bolt anchor, and defeat one of the advantages of my invention.

In operation, the bolt anchor 6, Fig. 14, is placed within hole 15 in a wall or other support 16. The machine bolt 18 is then passed through a hole in the work 19, through the unthreaded conical sleeve 11 and engages with the female threads in the conical nut 7, Fig. 15. By screwing up on the head 20 of the machine bolt the expanding lugs 9—9 cooperating with the inclined surfaces 10—10 on the two shield sections 1 and 2 will cause the expansion of the shield adjacent to the nut, and also at the same time the portion of the shield 6 in contact with the unthreaded sleeve 11, by causing the inclined surfaces 13—13 of the shield sections 1 and 2 to ride up, more or less, the expanding lugs 12—12 on the unthreaded sleeve 11, all as well known in the art, forming what is known as a double expansion machine bolt anchor.

I also provide the meeting surfaces 10—10 of the shield sections 1 and 2 with a stop, 21, Fig. 8, to cooperate with the head of the expanding lug 9 on the threaded nut 7, to prevent further or excessive loads on the expansion bolt, pulling the bolt 18, with the nut 7 and sleeve 11 from the shield 6, with the consequent damage to property, or possible loss of life. The need for and the action of, such stops are fully described in my Patent 1,549,327, previously referred to.

In my present invention, my nut stop 21 is located on the open, unconnected, or free meeting surfaces, and not on the meeting surfaces which are connected by the neck or web 3, Figs. 8 and 16. On the meeting surfaces connected by the web or neck 3, this web or neck itself forms a stop. This is shown more clearly in Fig. 20, where the lug 109, which acts the same as lug 9, is brought up hard against the neck or web 103, which acts the same as neck 3.

Figure 18:
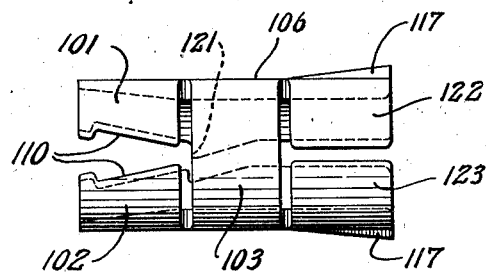
Figs. 18, 19 and 20, illustrate a modification in which my invention is applied to what is known in the art as a single expansion machine bolt anchor.
Figure 19:
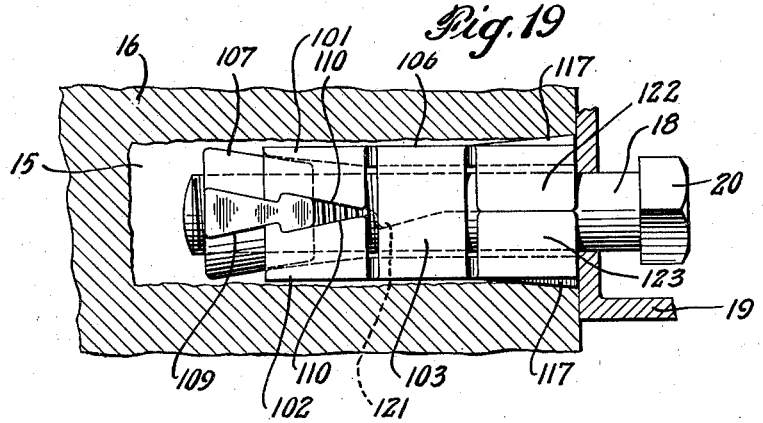
Figure 20:
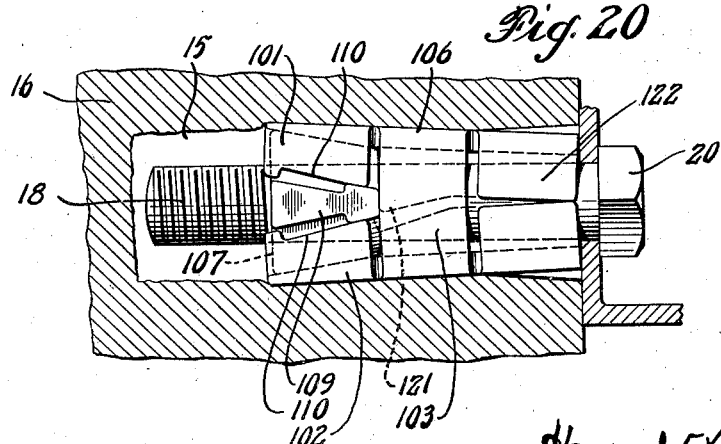

In Figs. 18, 19 and 20, I have illustrated my invention applied to what is known in the art as a single machine-type expansion bolt. To avoid confusion with the double expansion type, which is illustrated in the other figures, I have used similar but different designating numerals.

In this form, there is no moveable unthreaded sleeve, the expansion being mainly at the inner end and performed by the machine bolt 18 engaging with the threads of the nut 107, provided with the expanding lugs 109—109.

In this form, the shield sections 101 and 102 and the connecting web or neck 103 are cast, as in the other form, and bent in a press exactly the same as in the first form described. A preliminary bending permits the insertion of the screw-threaded nut 107. The final bending locks the nut 107 to the shield 106. In this form, the shield section 101 is provided with cast wings 122, and the section 102 is provided with cast wings 123, both of which are bent in the press to form semi-cylindrical portions as shown in Figs. 18–20. The shield section 101 is provided with inclined surfaces 110, and a stop 121. The shield section 102 is also provided with inclined surfaces 110, but not with a stop for the integral web or neck 103 acts as a stop on the side of the shield 106, opposite the stop 121, see Fig. 20. The operation of this form is similar to that of the other form, except, of course, it is a single expansion and not a double expansion.

In the single expansion bolt anchor 106, where no sleeve is employed, the ribs 117 may be placed on one or both of the wings 122 and 123.

Having thus described this invention in connection with illustrative embodiments thereof, to the detail of which I do not desire to be limited except as by the terms of my claims, which is claimed as new and what is desired to secure by Letters Patent is set forth in the appended claims.

What I claim is:

1. In a machine type expansion bolt, formed of a plurality of cast metal shield sections, connected together by an integral cast metal web or neck, one of the shield sections being provided with a stop to prevent excessive expansion, and expansion means provided with lugs, one to engage with said stop on the shield, and the other to engage with the web or neck which forms a second cooperating stop.

2. In a double expansion machine type bolt anchor, a shield formed of a plurality of sections held together with an integral web or neck, an expanding nut, an unthreaded expanding sleeve, provided with thin anti-turning ribs, to permit the bolt anchor to be driven home in a hole in a wall, or other support without creating any expansion on the shield.

3. In a double expansion machine type bolt anchor, a shield formed of a plurality of sections, held together with an integral web or neck, an expanding nut, an unthreaded expanding sleeve, and anti-turning means mounted only on the sleeve, to permit the bolt anchor to be driven home in a hole in a wall or other support, without creating any expansion on the shield.

4. In a single expansion machine type bolt anchor, the combination of a plurality of cast shield sections, an integral cast web or neck connecting the sections of the shield, and an expanding nut mounted between the shield sections and held in position by the normally rigid web or neck.

5. A new article of manufacture, comprising a bolt anchor having an expansible shield, formed of a plurality of separate parts, connected between their ends by an integral expansible web or neck, said web or neck being bent to bring the separate parts of the shield adjacent to each other, and sliding non-rotatable expanding means held in the shield by the expansible and bendable web or neck.

6. A new article of manufacture, comprising a bolt anchor having an expansible shield, formed of a plurality of separate parts, connected between their ends by an integral expansible web or neck, said web or neck being bent to bring the separate parts of the shield adjacent to each other, said integral web or neck having sufficient rigidity to hold within the shield sliding expanding means, without the aid of other means, and of sufficient pliability to expand slightly to permit ready expansion of the shield sections when located in operative position in a hole in a wall or other support, and subjected to operative expansion strains, and sliding expanding means mounted within the shield sections.

7. A new article of manufacture, comprising a bolt anchor having an expansible shield, formed of a plurality of separate metal parts, connected together by an integral expansible web or neck, bent to bring the shield sections adjacent to each other, said integral metal web or neck being of sufficient rigidity to hold the shield sections and expanding means together for handling, transportation and location in a hole in a wall or other support, but adapted to permit free expansion of the bolt anchor shield under operative expansion strains, and expanding means held in the shield by the integral bendable web or neck.

8. A new article of manufacture, comprising a bolt anchor having a shield formed of separate rigid members, and an integral bendable web or neck located between the ends of the shield sections adjacent to each other, to secure expanding means and bent to bring the shield sections adjacent within the shield, and sliding expanding means mounted in the shield and adapted to expand the shield members.

9. A new article of manufacture, comprising a cast metal bolt anchor shield, formed of separate cast metal parts, and an integral cast metal web or neck, located between the ends of the shield parts, said integral web or neck being bent to rigidly hold sliding expanding means within the shield, but adapted to be bent under operative expansion strains in situ, and sliding expanding means mounted in the shield.

10. In a double expansion machine expansion bolt anchor, the combination of separate and independent expansible shield sections, expansion means mounted in both ends of the shield sections, and bendable non-spring means adapted to hold the sections together, and at the same time to hold the expansion means within the shield sections.

11. In a double expansion machine expansion bolt anchor, formed of a plurality of separate shield sections, connected together by an integral bendable web or neck, bent to bring the shield sections adjacent to each other, and prevent the escape of expanding means mounted in the shield, but adapted to give slightly under operative expansion strains of the expanding means, and expanding means mounted at either end of the shield sections.

12. In a machine expansion bolt anchor, formed of a plurality of separate and independent cast metal shield sections, connected between their ends by an integral cast metal web or neck, expansion means mounted between the shield sections, the integral cast web or neck being adapted to be bent under operative expansion strains, but being of sufficient rigidity to rigidly hold the shield sections and expanding means against strains due to handling, transportation, and insertion within a hole.

13. In a double expansion machine bolt anchor, provided with a plurality of separate shield sections, expanding means to expand the shield sections, and non-spring means to hold the shield sections together for handling, transportation, and insertion in a hole, said non-spring means adapted to be bent slightly when subjected to the strains of the expanding means, to permit the separate shield sections to move radially in the hole.

14. In a double expansion machine expansion bolt anchor, provided with a plurality of separate shield sections, expanding means to expand the shield sections, and non-spring means mounted between the ends of the shield sections, to hold the shield sections together for handling, transportation, and insertion in a hole, said non-spring means being adapted to be bent slightly when subjected to the strains of the expanding means, to permit the shield sections to move radially and grip the walls of the hole.

15. In a double expansion machine expansion bolt anchor, provided with a plurality of separate shield sections, one of which is provided with a stop, expanding means to expand the shield sections, said expanding means provided with a plurality of lugs, one of which cooperates with the stop on one of the shield sections, and another with non-spring means holding the sections together, and non-spring means to hold the shield sections together for handling, transportation and insertion in a hole, said non-spring means adapted to be bent slightly when subjected to the strains of the expanding means, to permit the separate shield sections to move radially to grip the walls of the hole in which they are mounted.

HENRY W. PLEISTER.